United States Patent
Richard et al.

(10) Patent No.: US 10,215,082 B2
(45) Date of Patent: Feb. 26, 2019

(54) DIRECT FUEL INJECTION COMBUSTION ENGINE AND MORE PARTICULARLY A COMPRESSION-IGNITION ENGINE WITH A LOW COMPRESSION RATIO

(71) Applicant: IFP Energies nouvelles, Rueil-Malmaison (FR)

(72) Inventors: Stéphane Richard, Bazainville (FR); Lionel Martinez, Maulette (FR); Olivier Laget, Rueil-Malmaison (FR)

(73) Assignee: IFP Energies nouvelles, Rueil-Malmaison (FR)

( * ) Notice: Subject to any disclaimer, the term of this patent is extended or adjusted under 35 U.S.C. 154(b) by 0 days.

(21) Appl. No.: 15/115,222

(22) PCT Filed: Jan. 12, 2015

(86) PCT No.: PCT/EP2015/050410
§ 371 (c)(1),
(2) Date: Jul. 28, 2016

(87) PCT Pub. No.: WO2015/113803
PCT Pub. Date: Aug. 6, 2015

(65) Prior Publication Data
US 2016/0341106 A1   Nov. 24, 2016

(30) Foreign Application Priority Data
Jan. 29, 2014 (FR) .................................. 14 50704

(51) Int. Cl.
*F02B 23/06* (2006.01)
*F02M 61/18* (2006.01)
(Continued)

(52) U.S. Cl.
CPC ............ *F02B 23/0696* (2013.01); *F02B 9/02* (2013.01); *F02B 17/005* (2013.01);
(Continued)

(58) Field of Classification Search
CPC .......... F02B 1/12; F02B 9/02; F02B 23/0651; F02B 23/0669; F02B 23/0672;
(Continued)

(56) References Cited

U.S. PATENT DOCUMENTS 6,513,487 B1 * 2/2003 Jorach ....................... F02B 1/12
                                                          123/269
7,185,614 B2 * 3/2007 Meffert ............... F02B 23/0672
                                                          123/269
(Continued)

FOREIGN PATENT DOCUMENTS

DE   10 2011 017479 A1   10/2012
FR        1360426 A       5/1964
(Continued)

OTHER PUBLICATIONS

International Search Report for PCT/EP2015/050410 dated Feb. 13, 2015; English translation herewith (8 Pages).

*Primary Examiner* — John Kwon
*Assistant Examiner* — Johnny H Hoang
(74) *Attorney, Agent, or Firm* — Fitch, Even, Tabin & Flannery LLP

(57) ABSTRACT

The present invention is a compression-ignition direct-injection internal-combustion engine comprising at least a cylinder (10), a cylinder head (12) carrying fuel injection means (14), a piston (16) sliding in the cylinder, a combustion chamber (34) limited on one side by an upper face (44) of the piston comprising a projection (48) extending in the direction of the cylinder head and located in a center of a concave bowl (46). The engine comprises injection projecting fuel in at least two fuel jet sheets. One of the zones comprises a toroidal volume (64) having center B with a flat bottom (56) into which fuel jets (40) of the lower sheet are
(Continued)

injected so that an axis C1 of the lower sheet jets is contained between center B and projection (48).

21 Claims, 2 Drawing Sheets

(51) Int. Cl.
| | |
|---|---|
| *F02M 45/08* | (2006.01) |
| *F02B 9/02* | (2006.01) |
| *F02B 17/00* | (2006.01) |
| *F02F 1/24* | (2006.01) |
| *F02F 3/26* | (2006.01) |
| *F02M 61/14* | (2006.01) |
| *F02B 1/12* | (2006.01) |

(52) U.S. Cl.
 CPC ...... *F02B 23/0651* (2013.01); *F02B 23/0669* (2013.01); *F02B 23/0672* (2013.01); *F02B 23/0693* (2013.01); *F02F 1/242* (2013.01); *F02F 3/26* (2013.01); *F02M 45/086* (2013.01); *F02M 61/14* (2013.01); *F02M 61/182* (2013.01); *F02M 61/1806* (2013.01); *F02M 61/1813* (2013.01); *F02B 1/12* (2013.01); *Y02T 10/125* (2013.01)

(58) Field of Classification Search
 CPC .............. F02B 23/0687; F02B 23/0693; F02B 23/0696; F02M 61/14; F02M 61/1806; F02M 61/1813; F02M 61/182; F02M 45/086; F02F 1/242; F02F 3/26
 USPC ....... 123/275, 276, 290, 294, 298, 301, 305, 123/307
 See application file for complete search history.

(56) References Cited

U.S. PATENT DOCUMENTS

| | | | | |
|---|---|---|---|---|
| 8,272,207 | B2* | 9/2012 | Kurtz | F02D 41/024 123/27 R |
| 8,327,822 | B2* | 12/2012 | Asai | F02B 23/0651 123/298 |
| 8,671,908 | B2* | 3/2014 | Ives | F02B 23/0651 123/145 A |
| 8,677,970 | B2* | 3/2014 | Venugopal | F02B 23/0651 123/193.1 |
| 9,121,336 | B2* | 9/2015 | Lee | F02B 23/0651 |
| 9,284,877 | B2* | 3/2016 | Yoo | F02B 23/0696 |
| 9,429,065 | B2* | 8/2016 | Zoeller | F02B 23/0651 |
| 2004/0020457 | A1* | 2/2004 | Regueiro | F02B 23/0669 123/276 |
| 2005/0120995 | A1* | 6/2005 | Tsujimoto | F02B 23/0669 123/299 |
| 2008/0257302 | A1* | 10/2008 | Hunter | F02B 17/005 123/295 |
| 2011/0271931 | A1* | 11/2011 | Rothbauer | F02B 23/0636 123/279 |
| 2014/0048036 | A1 | 2/2014 | Zoeller et al. | |
| 2015/0020765 | A1* | 1/2015 | Pierpont | F02F 3/28 123/27 R |
| 2016/0265418 | A1* | 9/2016 | Martinez Alvarado | F02B 1/12 |
| 2016/0341106 | A1* | 11/2016 | Richard | F02M 45/086 |
| 2016/0348571 | A1* | 12/2016 | Huang | F02B 43/00 |

FOREIGN PATENT DOCUMENTS

| | | |
|---|---|---|
| FR | 2 868 480 A1 | 10/2005 |
| FR | 2 878 906 A1 | 6/2006 |
| FR | 2 879 676 A1 | 6/2006 |
| FR | 2 912 184 A1 | 8/2008 |
| JP | 571347 A | 3/1993 |

* cited by examiner

DIRECT FUEL INJECTION COMBUSTION ENGINE AND MORE PARTICULARLY A COMPRESSION-IGNITION ENGINE WITH A LOW COMPRESSION RATIO

CROSS REFERENCE TO RELATED APPLICATIONS

Reference is made to PCT Application PCT/EP2015/050410 filed Jan. 12, 2015, and French Patent Application No. 14/50.704 filed Jan. 29, 2014, which are incorporated herein by reference in their entirety.

BACKGROUND OF THE INVENTION

Field of the Invention

The present invention relates to a direct-injection combustion engine, and more particularly to a compression-ignition engine and to a method of use thereof. More particularly the invention relates to an engine usable for air transport or road use, or in the field of stationary equipment such as engines and generators.

Description of the Prior Art

This type of engine generally comprises at least for a cylinder, a piston provided with a projection arranged in a concave bowl and which sliding in the cylinder in a reciprocating rectilinear motion, an intake for an oxidizer, a burnt gas exhaust, a combustion chamber and injectors means for injecting fuel into the combustion chamber.

Upon design of an engine, the performance, pollutant emission and mechanical strength constraints of the combustion chamber are increasingly high while the technology for meeting them are quite the opposite. Thus, performance increase generally leads to an increase in emissions and higher mechanical stress.

In order to overcome these constraints, to guarantee limited pollutant emissions and satisfactory mechanical strength over the entire operating range of the engine, in particular at very high load, all of the oxidizer present in the combustion chamber is used. For example an oxidizer comprising air at ambient pressure, supercharged air or a mixture of air (supercharged or not) and of recirculated burnt gas, is of great importance.

Indeed, the fuel mixture (oxidizer/fuel) in the combustion chamber needs to be as homogeneous as possible.

In practice, the fuel remains confined in the bowl and it cannot mix with the oxidizer contained notably in the compression area, that is in the volume located in the upper part of the combustion chamber limited by the cylinder wall and face of the cylinder head opposite the piston.

This involves the drawback of creating high richness areas in the combustion zone, which generate a high production of soot, carbon oxide (CO) and unburnt hydrocarbons (HC) upon combustion of the fuel mixture.

Furthermore, the thermal load is focused on the re-entrant part of the piston, which is the bowl neck or diameter restriction that marks the transition between the piston bowl and the upper zone encompassing the compression area, which may be limited in mechanical strength at very high loads.

As better described in patent application JP-5-71,347, one solution to overcoming the aforementioned drawbacks uses fuel injection with jets having at least two sheet angles and a piston comprising a bowl with two combustion volumes.

This allows using a larger amount of oxidizer compared to conventional engines and to distribution of the thermal load over a larger surface area of the combustion chamber.

However, this configuration does not allow optimizing the internal aerodynamics for using all of the oxidizer available in the two combustion volumes and to minimize overlap between the fuel jets from the various sheets. Finally, this configuration does not minimize wall wetting by liquid fuel.

To overcome these drawbacks, and as better described in French patent application No. 13-60,426 filed by the applicant, an internal-combustion engine is used comprising fuel injection with jets having at least two sheet angles and a piston comprising a bowl with two combustion volumes. A piston shape and internal aerodynamics substantially improving the combustion quality.

However, this shape is mainly suited for high compression ratios, on the order of 18 for example. Indeed, as the fuel jets of the lower sheet directly impact the toroidal part of the bowl tangentially to the surface of the piston, the bowl volume is limited. This leads to a small bowl volume and therefore to high compression ratios.

Engines comprising combustion chambers with lower compression ratios, between 13.5 and 16.5 for example, are however advantageous. They allow reducing the maximum compression pressure in the combustion chamber and the stress on the connecting-rod bearing. This decrease is thus particularly useful for high performance and high-power density engines.

SUMMARY OF THE INVENTION

The present invention thus improves engines described above by providing a piston shape and an injection method that substantially improves the quality of the mixture and the combustion for combustion chambers with compression ratios ranging between 13.5 and 16.5 to obtain performance gains, together with significant consumption and emission (CO, nitrogen oxides, unburnts, soots) gains, while decreasing the maximum pressure stresses in the combustion chamber and the stress undergone by the connecting-rod bearing.

The invention therefore relates to a compression-ignition direct-injection internal-combustion engine comprising at least one cylinder, a cylinder head carrying fuel injection, a piston sliding in the cylinder, a combustion chamber limited on one side by the upper face of the piston comprising a projection extending in the direction of the cylinder head and arranged in the center of a concave bowl. The engine comprises injections projecting fuel in at least two fuel jet sheets with different sheet angles, a lower sheet of jet axis C1 and an upper sheet of jet axis C2, at least two mixing zones of the combustion chamber. One of the zones comprises a toroidal volume of center B with a flat bottom into which the fuel jets of the lower sheet are injected in such a way that axis C1 of the lower sheet jets is contained between center B and the projection.

The fuel jet sheets can be arranged axially above one another.

The injector can comprise at least two injectors projecting fuel in a fuel jet sheet with different sheet angles.

The sheet angle of one of the sheets is at most 105° while the sheet angle of the other sheet is at least 150°.

The engine piston bowl can comprise a toroidal volume of radius R1 and R2, a bowl bottom diameter FD, a bowl bottom inside diameter FID, a bowl opening diameter BD, a neck diameter GD, an upper injection diameter ID1, a developed length of the diametral section 2*Cb of the bowl, a projection height H and a bowl height L, and the dimensions of the bowl can meet at least one of the following conditions:

ratio BD/L can be less than 6, preferably less than 4,
ratio FD/BD can be less than 1,
FD-FID can be strictly positive,
ratio 2*Cb/BD can be less than 2,
ratio GD/BD can range between 0.7 and 1,
ratio H/L can be greater than 50% and preferably greater than 60%,
ratio R2/R1 can be less than 1 and preferably less than 0.6,
ratio ID1/GD can be greater than 1,
ID1 can be less than (GD+(2*Cb−GD)*⅔).

The bowl can comprise an angle of inclination a3 for the inclined flank of the projection, an angle of inclination a4 formed by the principal axis of the fuel jets of the lower sheet injected into the torus by impacting the torus at a point and by the tangent to the impact point, an angle of inclination a5 considered at the tangency of the outer rounded surface with the lateral wall, and an angle of inclination a6 with respect to the horizontal and the tangent to the substantially plane wall, which can meet at least one of the following conditions:

a3 can be substantially equal to the jet sheet half angle A1/2 of the lower sheet,
a4 can be greater than 100°;
a5 can range between 0° and 60°, preferably substantially between 30°; and 40°,
a6 can range between 15° and 75°.

The invention also relates to an injection method for a compression-ignition direct-injection internal-combustion engine comprising at least a cylinder, a cylinder head carrying a fuel injector, a piston sliding in the cylinder, a combustion chamber limited on one side by the upper face of the piston comprising a projection extending in the direction of the cylinder head and arranged in the center of a concave bowl. The method includes injecting the fuel in at least two fuel jet sheets with different sheet angles, a lower sheet of jet axis C1 and an upper sheet of jet axis C2. The method has for a position D of the piston considered between the bottom of the bowl and the origin of the fuel jets of the upper sheet, which substantially corresponds to D=L4+ID1/tan(a2) where L4 is the height between the bowl bottom and the point of impact of the fuel jets of the upper sheet, ID1 is the upper injection diameter considered between the points of impact and a2 is the half angle at the top of the upper sheet, in injecting the fuel of the lower sheet into a zone comprising a toroidal volume of center B with a flat bottom so that axis C1 of the fuel jets of the sheet is contained between center B and the projection.

BRIEF DESCRIPTION OF THE DRAWINGS

Other features and advantages of the invention will be clear from reading the description hereafter, given by way of non-limitative example, with reference to the accompanying figures wherein.

DETAILED DESCRIPTION OF THE INVENTION

Figure 1:
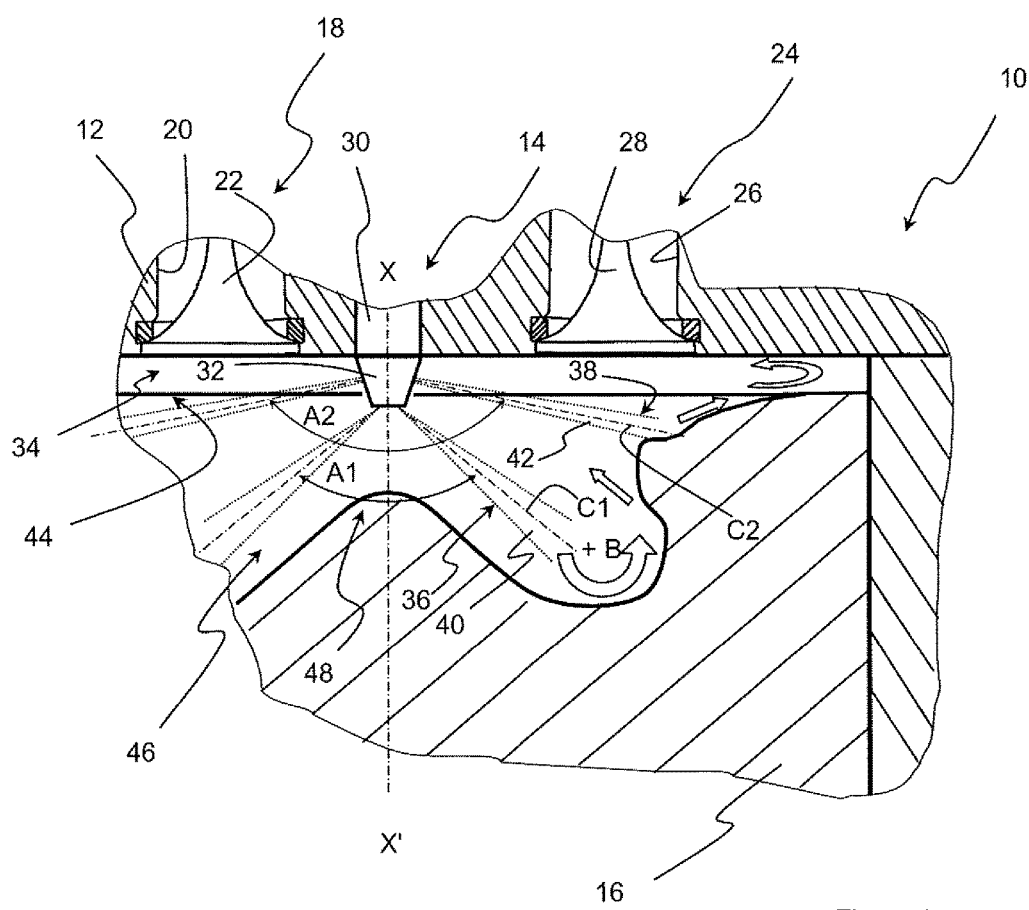
FIG. 1 shows an internal-combustion engine according to the invention.

With reference to FIG. 1, a compression-ignition direct-injection internal-combustion engine comprises at least a cylinder 10, a cylinder head 12 closing the cylinder in the upper part, a fuel injector 14 carried by the cylinder head and a piston 16 having axis XX' sliding in the cylinder with a reciprocating rectilinear motion.

Fuel is understood to be a liquid fuel such as diesel fuel, kerosene or any other fuel with the physicochemical characteristics allowing operation of an engine of compression ignition type including a direct injection system for this fuel.

This engine also comprises a burnt gas exhaust 18 with at least one exhaust pipe 20 whose opening can be controlled by any means such as an exhaust valve 22 for example, and an intake 24 for an oxidizer with at least one intake pipe 26 whose opening can be controlled by any means such as an intake valve 28 for example.

An oxidizer is understood to be air at ambient pressure or supercharged air or a mixture of air (supercharged or not) and burnt gas.

The injectors comprise at least one fuel injector 30, preferably arranged along axis XX' of the piston, whose nozzle 32 comprises a multiplicity of orifices through which the fuel is sprayed and projected in the direction of combustion chamber 34 of the engine.

It is from the injector that the projected fuel forms at least two fuel jet sheets, here two sheets 36 and 38 of fuel jets 40 and 42, which, in the example shown, have a general axis merged with that of piston 16 while being axially positioned one above the other.

More precisely, sheet 36 that is the closer to piston 16 is referred to as the lower sheet in the description below, while sheet 38, that is further away from the piston, is referred to as the upper sheet.

As can be seen in FIG. 1, these two sheets form sheet angles A1 and A2 which are different from one another. A sheet angle is understood to be the top angle formed by the cone originating from the injector, whose imaginary peripheral wall passes through all the axes C1 and C2 of fuel jets 40 and 42.

Advantageously, sheet angle A1 of the lower sheet is at most equal to 105° and preferably ranges between 40° and 75°, while sheet angle A2 of the upper sheet is at most equal to 180° and preferably ranges between 150° and 180°.

Figure 2:
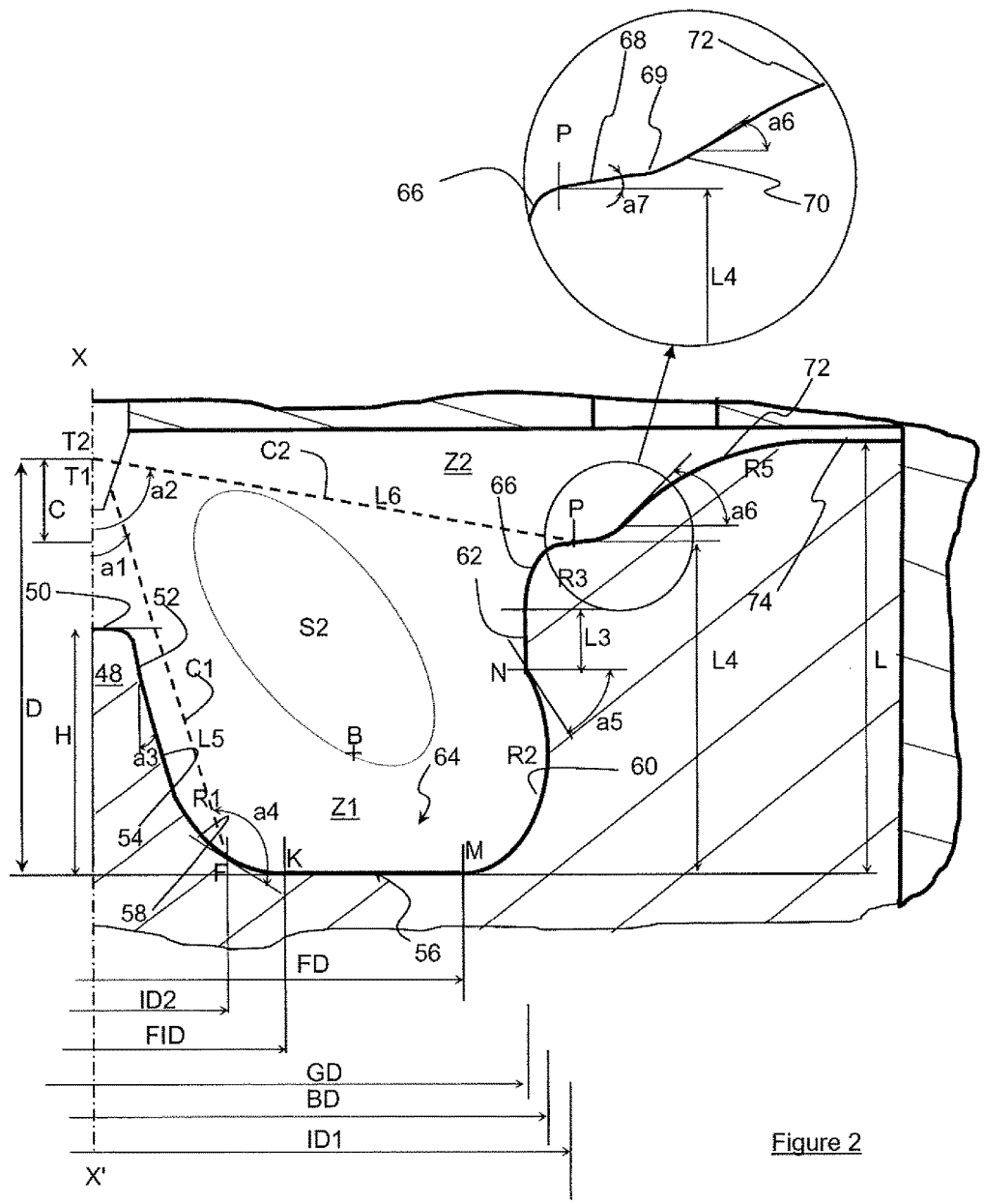
FIG. 2 is a large-scale partial view of a half section of the piston bowl profile of the engine of FIG. 1.

For simplification reasons, in the rest of the description, angle a1 corresponds to A1/2 and angle a2 corresponds to A2/2 as in FIG. 2.

The difference between the two sheet angles is thus at least 50° which limits fuel jet overlaps between the two sheets and therefore formation of pollutants such as soot.

Of course, it is possible for the injection and to not be arranged along axis XX'. In this case the general axis of the fuel jet sheets from the fuel injector is at least substantially parallel to this axis XX'.

Similarly, it is possible that each sheet is carried by a distinct injector (single-sheet injector) with dedicated targeting in distinct zones of the combustion chamber.

Combustion chamber 34 is limited by the inner face of cylinder head 12 opposite the piston, the circular inner wall of cylinder 10 and upper face 44 of piston 16.

The upper face of the piston comprises a concave bowl 46, whose axis is here merged with that of the cylinder, whose concavity is directed towards the cylinder head and which houses a projection 48 arranged substantially in the center of the bowl, which rises towards cylinder head 12, while being preferably coaxial with the axis of the fuel sheets from injector 30.

Of course, it is possible that the axis of the bowl is not coaxial with that of the cylinder. The main thing is that the layout according to which the axis of the fuel jet sheet, the axis of the projection and the axis of the bowl are preferably merged.

Furthermore, with reference to FIG. 2, projection 48, which is generally of truncated shape, comprises a top 50 extended, while moving symmetrically away from axis XX' towards the outside of piston 16, by a substantially rectilinear inclined surface 52 extended by an inclined flank 54 down to a bottom 56 of the bowl.

Of course, without departing from the scope of the invention, inclined surface 52 can be nonexistent (zero length) and inclined flank 54 then connects the top of the teat to the bottom of the bowl.

In the example of FIG. 2, the bottom of the bowl is a substantially plane surface 56 and it is connected on one side, at point K, to a concave rounded surface 58 in form of an arc of a circle with radius R1, which is referred to as inner rounded surface, is connected to the bottom of inclined flank 54, and is connected, on the other side, at point M, to another concave rounded surface 60 in form of an arc of a circle with radius R2, referred to as outer rounded surface, connected at the other end thereof to a lateral wall 62, substantially vertical here, at a point N.

The two rounded surfaces 58 and 60, as well as plane surface 56, thus limit the lower part of a toroidal volume, here a torus of substantially cylindrical section 64.

Lateral wall 62 is extended, still by moving away from axis XX', by a convex rounded surface 66 in form of an arc of a circle with radius R3, referred to as re-entrant, leading to an inclined plane 68 linked to a concave inflection surface 69 connected to a substantially plane surface 70. This plane surface is continued by an outer convex surface 72 in form of an arc of a circle with radius R5 that leads to a plane surface 74 extending up to the vicinity of the cylinder wall.

The combustion chamber thus comprises two distinct zones Z1 and Z2 where mixing of the oxidizer they contain (air, supercharged or not, or mixture of air and recirculated burnt gas) with the fuel coming from the injector, as well as combustion of the fuel mixture thus formed, occurs.

Zone Z1, delimited by projection 48, torus 64 at the bowl bottom, wall 62 and convex rounded surface 66, forms the lower zone of the combustion chamber associated with lower sheet 36 of fuel jets of axis C1. Zone Z2, limited by inclined plane 68, concave surface 69, substantially plane surface 70, convex surface 72, plane surface 74, the peripheral inner wall of the cylinder and cylinder head 12, forms the upper zone of this chamber associated with upper sheet 38 of fuel jets of axis C2.

In this configuration, the bowl comprises, for a piston position close to the top dead center:
a bowl bottom of outside diameter FD with a radius considered between axis XX' and point M at the junction between plane surface 56 and surface 60 of radius R2,
a bowl bottom inside diameter FID with a radius considered between axis XX' and point K at the junction between plane surface 56 and surface 58 of radius R1,
a bowl opening diameter BD with a radius considered in the vicinity of the bowl bottom and corresponding to a distance taken between axis XX' and the furthest point of outer concave surface 60,
a neck diameter GD with a radius corresponding to the distance between axis XX' and vertical wall 62 limiting the outlet section of this bowl,
an upper injection diameter ID1 with a radius corresponding to the distance between axis XX' and the start of inflection surface 69 at point P between inclined plane 68 and concave surface 70 by limiting a length L6 of jets 38 between the origin T2 of axis C2 of the jets on the axis of the injector nozzle and point P, meeting the formula $ID1/\sin(a2)$,
a developed length of the diametral half section Cb of the bowl, having a length from the intersection of the projection top with axis XX' to the cylinder wall,
a projection height H between the bowl bottom at point M and the top of the projection,
a bowl height L between the bowl bottom at point M and plane surface 74,
a junction height L3 corresponding to the extent of lateral wall 62 considered between the end of outer rounded surface 60 at point N and the start of outer rounded surface 66,
a height L4 considered between point P and point M,
an angle of inclination a3 with respect to a vertical for inclined flank 54,
an angle of inclination a4 formed by principal axis C1 of the fuel jets of lower sheet 36 impacting the torus with the tangent to impact point F by limiting a length L5 of jets 40 between origin T1 of axis C1 of the jets on the axis of the injector nozzle and point F. This length L5 meets formula $ID2/\sin(a1)$, with ID2 corresponding to a lower injection diameter with a radius that corresponds to the distance between axis XX' and point F,
an angle of inclination a5 considered at the tangency of outer rounded surface 60 with lateral wall 62 at point N,
an angle of inclination a6 with respect to the horizontal and the tangent to substantially plane wall 70,
an angle of inclination a7 with respect to the horizontal and inclined plane 68 at intersection point P.

All these parameters are appreciated for a position of piston 16 in the vicinity of the top dead center that corresponds to a distance D considered between point M and the origin T2 of axis C2 of jets 42.

More precisely, this distance D is equal to the sum of height L4 and height C, height C corresponding to the axial height between origin T2 and point P. This height corresponds to formula $ID1/\tan(a2)$.

Thus, the dimension and angle parameters of this bowl meet at least one of the following conditions:
angle a4 is greater than 100°, which amounts to making the fuel jets of the lower sheet impact descending surface 58 of radius R1 and to redirecting this fuel jet onto plane surface 56 and surface 60 of radius R2, and thus to generating an aerodynamic upward motion in the torus towards the top and the center of the cylinder, which allows minimizing all the more the interaction with the upper sheet;
angle a5 must be positive and less than 60°. Preferably, it has to be of the order of 30° to 40° to direct fuel jets 40 of lower sheet 36 towards oxidizer volume S2 in order to use the oxidizer of this zone while limiting upflow of this fuel towards upper sheet 38;
the position of the top of projection 48 is as close as possible to nozzle 32 of injector 30s to limit the volume of oxidizer under the injector that will not be impacted by the fuel jets. Thus, ratio H/L is greater than 40% and preferably greater than 60%;
angle a3 is substantially equal to angle a1 of the lower sheet. Thus, the general axis of the lower sheet jets is tangential to flank 54 of the projection. The lower jets can thus impact rounded surface 58 by vaporizing totally prior to impacting the piston;
oxidizer volume S2 between the two sheets is non-zero since the interaction between the sheets is detrimental to the pollutants. Volume S2 however needs to be minimized. Therefore, junction length L3 between the torus and re-entrant 66 (convex rounded surface of center R3) has to be such that L3/(2*length of R2)<1 or (L3/length of R2<2) in order to ensure that oxidizer volume S2 available between the upper sheet 38 and lower 36 sheets is low in relation to the fuel volume generated by the jets of the lower sheet;

second combustion zone Z2 arranged in the upper part of the piston that starts from re-entrant 66 is intended for fuel jets 42 of upper sheet 38;

the combustion volume of zone Z2 is at least equal to one tenth of the total volume of the bowl, the area referred to as compression area is formed by inclined plane 68, concave surface 69, plane surface 70, convex surface 72 and plane surface 74. Angle a6 ranges between 10° and 75°, which allows fuel jets 42 to create an aerodynamic motion above the piston and additionally to use the oxidizer in the compression area. This aerodynamics allows better fuel/oxidizer mixing above the piston, notably during the engine expansion phase, thus promoting oxidation of the burnt gas, in order to promote the impact of jets 42 on the compression area, a guiding surface 68 is provided between re-entrant 66 and surface 70. This guiding surface can be rounded in the continuation of the re-entrant or substantially plane. The purpose of this guiding surface is to concentrate fuel jets 42 and to guide them towards convex surface 72. Thus, this guiding surface has an angle a7 at intersection point P whose difference with respect to angle a2 is less than 45°, surfaces 58 and 60 have to be connected by a flat bottom of non-zero length (dimension equal to FD minus FID), the position of inflection surface 69 is such that distances (L5+(FD-FID)) and L6 are approximately of the same order (0.5<(L5+(FD-FID))/L6<2). Thus, advantageously, the fuel jets of the lower and upper sheets will impact substantially at the same time surface 60 of the torus and the inflection zone respectively, diameter ID1 must be such that ID1/GD>1 and ID1< (GD+(Cb−GD)*⅔). This allows fuel jets 42 to optimize the aerodynamics above the piston.

Furthermore, ratio BD/L is less than 6, preferably less than 4;
ratio R2/R1 is less than 1, preferably less than 0.6;
ratio FD/BD is less than 1;
ratio Cb/BD is less than 2 so as to maintain complete vaporization of the fuel and to prevent wetting of the cylinder wall;
ratio GD/BD ranges between 0.7 and 1 for the torus aerodynamics and upflow of the fuel jets;
ratio H/L is greater than 40%, preferably greater than 60% so as to minimize the oxidizer volume between the injector nozzle and the projection,
ratio (L5+(FD-FID))/L6 ranges between 0.5 and 2 for the impact of the two fuel jet sheets at the same time on the inflection zone and the rising portion of the torus;
A1 ranges between 40° and 105° with a1=A1/2;
A2 ranges between 150° and 180° with a2=A2/2;
a3 is substantially equal to a1;
a4 is greater than 100°;
a5 ranges between 0° and 60°, preferably substantially between 10° and 50°;
a6 ranges between 15° and 75°;
a7-a2 is less than 45°;
ratio ID1/GD is greater than 1; and
ID1 is less than (GD+(Cb-GD)*⅔).

Thus, by means of the parametrization of the bowl, the fuel jets of lower sheet 36 directly target torus 64 and do not directly impact re-entrant 66.

Therefore, combustion of the lower fuel/oxidizer mixture occurs essentially in the lower piston volume, that is in the torus, which combustion of the upper fuel/oxidizer mixture occurs essentially in the compression area above the piston.

This bowl parametrization suited for low compression ratios, between 13.5 and 16.5 for example, which allows a much more limited interaction of the upper sheet jets with the lower sheet jets, which allows the fuel/oxidizer mixture to be homogenized while meeting mechanical strength constraints at high or very high load.

The invention claimed is:

1. A compression ignition direct fuel injection internal combustion engine comprising:
   a cylinder, a cylinder head providing the direct fuel injection into the cylinder, a piston sliding in the cylinder, a combustion chamber limited on one side by an upper face of the piston which includes a projection extending in a direction of the cylinder head and positioned in a concave bowl, the direct fuel injection projecting fuel in at least two fuel jet sheets which are separated from each other and which extend from the cylinder head to the piston and are directed at different sheet angles, a lower fuel jet sheet having a lower fuel jet axis and an upper fuel jet sheet having an upper fuel jet axis, at least two mixing zones in the combustion chamber, one of the mixing zones including a toroidal volume having a center and a flat bottom portion into which the fuel of the lower fuel jet sheet is directed so that the lower fuel jet axis is contained between the center of the toroidal volume and the projection and wherein the engine operates with a compression ratio of about 13.5 to 16.5.

2. An internal combustion engine as claimed in claim 1, wherein the fuel jet sheets are located axially above one another.

3. An internal combustion engine as claimed in claim 1, wherein the direct fuel injection in the cylinder head comprises at least two orifices which project fuel respectively in the upper and lower fuel jet sheets at different sheet angles.

4. An internal combustion engine as claimed in claim 2, wherein the direct fuel injection in the cylinder head comprises at least two orifices which project fuel respectively in the upper and lower fuel jet sheets at different sheet angles.

5. An internal combustion engine as claimed in claim 1, wherein one of the sheet angles is at most 105° and another of the angles is at least 150° and the sheet angles are measured between portions of the sheets which are separated by a cone formed by the fuel jet axis of each sheet.

6. An internal combustion engine as claimed in claim 2, wherein one of the sheet angles is at most 105° and another of the angles is at least 150° and the sheet angles are measured between portions of the sheets which are separated by a cone formed by the fuel jet axis of each sheet.

7. An internal combustion engine as claimed in claim 3, wherein one of the sheet angles is at most 105° and another of the angles is at least 150° and the sheet angles are measured between portions of the sheets which are separated by a cone formed by the fuel jet axis of each sheet.

8. An internal combustion engine as claimed in claim 4, wherein one of the sheet angles is at most 105° and another of the angles is at least 150° and the sheet angles are measured between portions of the sheets which are separated by a cone formed by the fuel jet axis of each sheet.

9. An internal-combustion engine as claimed in claim 1, wherein the bowl comprises a toroidal volume of radius R1 and R2, a bowl bottom diameter FD, a bowl bottom inside diameter FID, a bowl opening diameter BD, a neck diameter GD, an upper injection diameter ID1, a developed length of the diametrical section 2Cb of the bowl, a projection height H and a bowl height L, wherein the dimensions of the bowl meet at least one of the following conditions:
ratio BD/L is less than 6;
ratio FD/BD is less than 1;
FD-FID is only positive;
ratio 2Cb/BD is less than 2;
ratio GD/BD ranges between 0.7 and 1;
ratio H/L is greater than 0.5;
ratio R2/R1 is less than 1;
ratio ID1/GD is greater than 1; and
ID1 is less than $(GD+(2Cb-GD)^{2/3})$.

10. An internal-combustion engine as claimed in claim 2, wherein the bowl comprises a toroidal volume of radius R1 and R2, a bowl bottom diameter FD, a bowl bottom inside diameter FID, a bowl opening diameter BD, a neck diameter GD, an upper injection diameter ID1, a developed length of the diametrical section 2Cb of the bowl, a projection height H and a bowl height L, wherein the dimensions of the bowl meet at least one of the following conditions:
ratio BD/L is less than 6;
ratio FD/BD is less than 1;
FD-FID is only positive;
ratio 2Cb/BD is less than 2;
ratio GD/BD ranges between 0.7 and 1;
ratio H/L is greater than 0.5;
ratio R2/R1 is less than 1;
ratio ID1/GD is greater than 1; and
ID1 is less than $(GD+(2Cb-GD)^{2/3})$.

11. An internal-combustion engine as claimed in claim 3, wherein the bowl comprises a toroidal volume of radius R1 and R2, a bowl bottom diameter FD, a bowl bottom inside diameter FID, a bowl opening diameter BD, a neck diameter GD, an upper injection diameter ID1, a developed length of the diametrical section 2Cb of the bowl, a projection height H and a bowl height L, wherein the dimensions of the bowl meet at least one of the following conditions:
ratio BD/L is less than 6;
ratio FD/BD is less than 1;
FD-FID is only positive;
ratio 2Cb/BD is less than 2;
ratio GD/BD ranges between 0.7 and 1;
ratio H/L is greater than 0.5;
ratio R2/R1 is less than 1;
ratio ID1/GD is greater than 1; and
ID1 is less than $(GD+(2Cb-GD)^{2/3})$.

12. An internal-combustion engine as claimed in claim 5, wherein the bowl comprises a toroidal volume of radius R1 and R2, a bowl bottom diameter FD, a bowl bottom inside diameter FID, a bowl opening diameter BD, a neck diameter GD, an upper injection diameter ID1, a developed length of the diametrical section 2Cb of the bowl, a projection height H and a bowl height L, wherein the dimensions of the bowl meet at least one of the following conditions:
ratio BD/L is less than 6;
ratio FD/BD is less than 1;
FD-FID is only positive;
ratio 2Cb/BD is less than 2;
ratio GD/BD ranges between 0.7 and 1;
ratio H/L is greater than 0.5;
ratio R2/R1 is less than 1;
ratio ID1/GD is greater than 1; and
ID1 is less than $(GD+(2Cb-GD)^{2/3})$.

13. An internal-combustion engine as claimed in claim 5, wherein a ratio of H/L is greater than 0.6 and a ratio of R2/R1 is less than 0.6.

14. An internal combustion engine as claimed in claim 1, wherein the bowl comprises an outer rounded surface connected to a lateral wall continued by a convex rounded surface extending to an inclined plane connected to a concave inflection surface connected to a plane surface, an angle of inclination for an inclined flank of the projection, an angle of inclination formed by a principal axis of fuel jets of the lower fuel jet sheet injected into the toroidal volume by impacting the toroidal volume at an impact point and by a tangent to the impact point, an angle of inclination considered at a tangency of an outer rounded surface with a lateral wall, and an angle of inclination with respect to horizontal and a tangent to a plane wall, wherein at least one of the following conditions is met:
a3 is substantially equal to a jet sheet half angle A1/2 of the lower fuel jet sheet;
a4 is greater than 100°;
a5 ranges between 0° and 60°; and
a6 ranges between 15° and 75°.

15. An internal-combustion engine as claimed in claim 14, wherein A5 ranges between 30° and 40°.

16. An internal combustion engine as claimed in claim 2, wherein the bowl comprises an outer rounded surface connected to a lateral wall continued by a convex rounded surface extending to an inclined plane connected to a concave inflection surface connected to a plane surface, an angle of inclination for an inclined flank of the projection, an angle of inclination formed by a principal axis of fuel jets of the lower fuel jet sheet injected into the toroidal volume by impacting the toroidal volume at an impact point and by a tangent to the impact point, an angle of inclination considered at a tangency of an outer rounded surface with a lateral wall, and an angle of inclination with respect to horizontal and a tangent to a plane wall, wherein at least one of the following conditions is met:
a3 is substantially equal to a jet sheet half angle A1/2 of the lower fuel jet sheet;
a4 is greater than 100°;
a5 ranges between 0° and 60°; and
a6 ranges between 15° and 75°.

17. An internal combustion engine as claimed in claim 3, wherein the bowl comprises an outer rounded surface connected to a lateral wall continued by a convex rounded surface extending to an inclined plane connected to a concave inflection surface connected to a plane surface, an angle of inclination for an inclined flank of the projection, an angle of inclination formed by a principal axis of fuel jets of the lower fuel jet sheet injected into the toroidal volume by impacting the toroidal volume at a point and by a tangent to an impact point, an angle of inclination considered at a tangency of an outer rounded surface with a lateral wall, and an angle of inclination with respect to horizontal and a tangent to a plane wall, wherein at least one of the following conditions is met:
a3 is substantially equal to a jet sheet half angle A1/2 of the lower fuel jet sheet;
a4 is greater than 100°;
a5 ranges between 0° and 60°; and
a6 ranges between 15° and 75°.

18. An internal combustion engine as claimed in claim 5, wherein the bowl comprises an outer rounded surface connected to a lateral wall continued by a convex rounded surface extending to an inclined plane connected to a concave inflection surface connected to a plane surface, an angle of inclination for an inclined flank of the projection, an angle of inclination formed by a principal axis of fuel jets of the lower fuel jet sheet injected into the toroidal volume by impacting the toroidal volume at an impact point and by a tangent to the impact point, an angle of inclination considered at a tangency of an outer rounded surface with a lateral wall, and an angle of inclination with respect to horizontal and a tangent to a plane wall, wherein at least one of the following conditions is met:

a3 is substantially equal to a jet sheet half angle A1/2 of the lower fuel jet sheet;

a4 is greater than 100°;

a5 ranges between 0° and 60°; and a6 ranges between 15° and 75°.

19. An internal combustion engine as claimed in claim 9, wherein the bowl comprises an outer rounded surface connected to a lateral wall continued by a convex rounded surface extending to an inclined plane connected to a concave inflection surface connected to a plane surface, an angle of inclination for an inclined flank of the projection, an angle of inclination formed by a principal axis of fuel jets of the lower fuel jet sheet injected into the toroidal volume by impacting the toroidal volume at an impact point and by a tangent to the impact point, an angle of inclination considered at a tangency of an outer rounded surface with a lateral wall, and an angle of inclination with respect to horizontal and a tangent to a plane wall, wherein at least one of the following conditions is met:

a3 is substantially equal to a jet sheet half angle A1/2 of the lower fuel jet sheet;

a4 is greater than 100°;

a5 ranges between 0° and 60°; and a6 ranges between 15° and 75°.

20. An injection method for a compression ignition direct fuel injection internal combustion engine including a cylinder, a cylinder head providing the direct fuel injection, a piston sliding in the cylinder, a combustion chamber limited on one side by an upper face of the piston including a projection extending in a direction of the cylinder head and located in a center of a concave bowl, comprising:

directly injecting fuel in at least two separated fuel jet sheets extending from the direct fuel injection at the cylinder head to the piston which are directed at different sheet angles, a lower fuel jet sheet having a jet axis and an upper fuel jet sheet having a fuel jet axis and at least two mixing zones in the combustion chamber wherein one of the zones includes a toroidal volume having a center and a flat bottom portion into which fuel of the lower fuel jet sheet is directed between the center of the toroidal volume and the projection with a distance D between a bottom of the bowl and an origin of the fuel jets of the upper sheet being expressed as D=L4+ID1/tan(a2) with L4 being a height between the bottom and a point of impact of the fuel jets of the upper sheet, ID1 is an upper fuel injection sheet diameter between an impact point and a2 is a half angle at a top of the upper fuel jet sheet for injecting fuel of the lower fuel jet sheet into the zone including the toroidal volume so that a fuel jet axis of the fuel jets of the lower sheet is contained between the center of the toroidal volume and the projection, and the combustion occurs at a compression ratio between about 13.5 and 16.5.

21. A method as claimed in claim 20, wherein:

a distance D between the flat bottom portion of the concave bowl is expressed by a relationship: D=L4+ID1/tan(a2) with L4 being a height between the flat bottom portion and a point of impact of the fuel jets of the upper sheet, ID1 is an upper fuel injection radius between an axis of direct injection and the point of impact and a2 is half an angle of sides of a cone at a top of the upper fuel jet sheet for injecting fuel of the upper fuel sheet into the lower mixing zone including the toroidal volume.

\* \* \* \* \*